3,340,242
POLYMERS OF HALOGENATED 5-NORBORNENE-
2,3-DIMETHANOLS
Emil J. Geering, Grand Island, N.Y., assignor to Hooker
Chemical Corporation, Niagara Falls, N.Y., a corporation of New York
No Drawing. Filed Nov. 25, 1964, Ser. No. 413,970
7 Claims. (Cl. 260—91.3)

ABSTRACT OF THE DISCLOSURE

Polymers having repeating units of the formula:

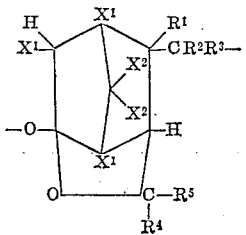

wherein $X^1$ is fluorine, chlorine or bromine,
$X^2$ is fluorine, chlorine, bromine or lower alkoxy,
$R^1$, $R^2$, $R^3$, $R^4$ and $R^5$ are hydrogen or alkyl, prepared by reacting a compound of the formula:

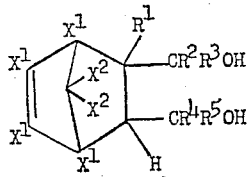

with an alkali metal hydroxide in an inert diluent, useful as protective coatings of films and in the making of shaped articles.

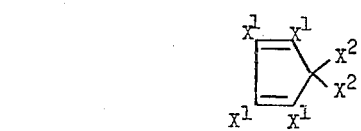

This invention relates to novel polymers of halogenated, bicyclic compounds and to the process for producing same. In another aspect, the invention relates to novel, fire-retardant polymeric compositions of matter.

The polymers of the invention can be utilized in a variety of applications. The polymers are well suited to the production of shaped articles, such as in the production of moldings, castings and laminated articles. They are also useful in the production of protective coatings and films.

The polymers of the invention have repeating units of the following formula:

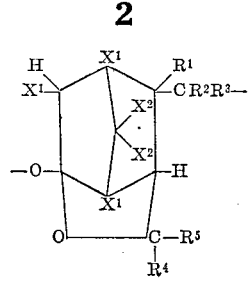

wherein $X^1$ is selected from the group consisting of fluorine, chlorine, and bromine;
$X^2$ is selected from the group consisting of fluorine, chlorine, bromine and lower alkoxy; and
$R^1$, $R^2$, $R^3$, $R^4$, $R^5$ are independently selected from the group consisting of hydrogen and alkyl.

The polymers generally have an average molecular weight of at least 2000 and the molecular weight can be up to 25,000 or higher. Accordingly, the polymers have an average of about 5 to about 70 repeating units of the formula. The end groups can be hydroxyl, or can be varied as desired. Thus, the polymer chains can be terminated by ester groups by reaction with acid. It is also possible to vary the cyclic nucleus of the repeating unit by utilizing different basic reactants as indicated hereinafter.

Illustrative examples of the alkyl substituents, which usually contain from 1 to about 18 carbon atoms are methyl, ethyl, propyl, isopropyl, butyl, isobutyl, amyl, hexyl, cyclohexyl, heptyl, octyl, nonyl, dodecyl, pentadecyl, stearyl, octadedecyl, and the like, said alkyl group being a monovalent radical derivable from an aliphatic hydrocarbon by the removal of one hydrogen atom. The lower alkyl radicals of 1 to 6 carbon atoms are generally preferred.

The polymers of the invention are prepared from selected cyclic alcohols, which are prepared by reacting the appropriate substituted cyclopentadiene and an unsaturated alcohol as represented by the following equation.

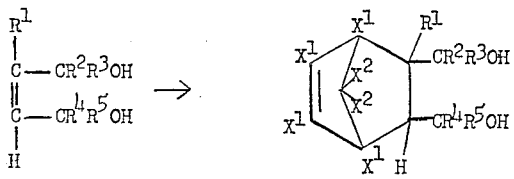

wherein $X^1$, $X^2$, $R^1$, $R^2$, $R^3$, $R^4$, $R^5$ have the values set forth hereinbefore. The preparation of such alcohols is described in detail in U.S. Patent 3,007,958. Suitable cyclopentadienes include, for example, 1,2,3,4,5,5-hexachlorocyclopentadiene; 1,2,3,4-tetrachloro-5,5-dibromocyclopentadiene; 1,2,3,4-tetrachloro-5,5-difluorocyclopentadiene; 1,2,3,4-tetrachloro-5,5-dimethoxycyclopentadiene; 1,2,3,4-tetrachloro-5,5-diethoxycyclopentadiene, and the like. Suitable unsaturated alcohols are, for example, 2-butene-1,4-diol; 3-hexane-2,5-diol; 8-hexadecene-7,10-diol; 1,4-cyclohexyl-2-butene-1,4-diol, and the like. The nature of the repeating unit of the polymers can be modified by utilizing other dienes, such as, butadiene, cyclopentadiene, furan, α-pyrone or substituted analogues, and the like. Also, other unsaturated alcohols can be used in preparing the cyclic alcohols, such as, compounds wherein a longer chain hydroxyalkyl substituent is attached to the carbon atom adjacent the double-bond.

In the process of the invention, polymeric compositions are produced by contacting the cyclic alcohol with an alkali metal hydroxide in an inert diluent that is a solvent for the cyclic alcohol. Suitable alkali metal hydroxides are the hydroxides of sodium, potassium, rubidium, cesium and lithium. The diluents for the reaction should be substantially nonreactive with either the cyclic alcohol or the alkali metal hydroxide, and should be a solvent for the cyclic alcohol. Suitable diluents include dioxane, tetrahydrofuran, dimethylformamide, dimethylsulfoxide, ketones, such as acetone, methylethyl ketone, methyl isopropyl ketone, methylhexyl ketone, and ethylheptyl ketone; organic esters, particularly the aliphatic esters, such as methyl, ethyl isopropyl and amyl acetates, the methyl, ethyl and butyl propionates, and the methyl and ethyl butyrates; the lower alkanols of one to six carbon atoms, such as methanol, ethanol, isopropanol, butanol, hexanol, and the like. Aqueous mixtures of these diluents can also be employed.

In the reaction process, the alkali metal hydroxide is preferably introduced to a solution of the bicyclic alcohol, in the form of a powdered solid, although the alkali metal hydroxide can be introduced as an aqueous or alcoholic solution to the solution of bicyclic alcohol, if desired. The alkali metal hydroxide is generally employed in an amount of about 0.5 to 10 moles of alkali metal hydroxide per mole of bicyclic alcohol, preferably in the range of 1 to 5 moles per mole. The concentration of bicyclic alcohol in the diluent can vary considerably, but is generally in the range of about 2 to about 20 weight percent of bicyclic alcohol based on the weight of the diluent, preferably in the range of about 5 to 15 weight percent, and more usually about 10 percent. When an alcohol is used as the diluent, the proportion of reactants is maintained below three moles of alkali metal hydroxide per mole of bicyclic alcohol, and preferably in the range of 1 to 2 moles per mole, to reduce participation of the alkoxide in the reaction to inhibit the formation of polymer chains. The reaction temperature can vary from about 0 to 150 degrees centigrade, but is preferably in the range of 15 to 100 degrees centigrade. The reaction is generally carried out at atmospheric pressure, although superatmospheric pressure or vacuum conditions can be employed. The reaction time is generally in the range of 0.1 to 5 hours, preferably 0.5 to 3 hours. The reaction mixture is preferably agitated to assure good mixing of the reactants.

At the conclusion of the reaction, the reaction mixture can be cooled and then acidified with a mineral acid, such as hydrochloric acid, to neutralize the excess alkali metal hydroxide. Thereafter, the reaction mixture is filtered to remove salt formed in the reaction and neutralization steps. Then, the polymer product is precipitated from the reaction mixture by contacting the mixture with water, or more preferably with an alcohol, such as a lower alkanol of 1 to 6 carbon atoms of the type illustrated hereinbefore. The amount of water or alcohol can be varied over a wide range, but is generally employed at the rate of about 5 to 50 parts by weight of diluent per part of polymer. More usually in the range of about 10 to 25 parts by weight of diluent per part of polymer. The precipitated polymer can be further purified by washing, extraction, reprecipitation, drying and other suitable methods.

The compositions of the invention can be used in a variety of product applications. Thus, the polymers can be employed in protective coatings and films. They can be compounded with various fillers, pigments, plasticizers, and other additives and be used in the preparation of molded articles. The polymers can be utilized with various reinforcing media such as glass fibers, synthetic polymer fibers, asbestos and the like, to provide laminated articles and other reinforced plastic articles. The polymers of the invention can be mixed with other polymeric compositions to impart fire retardancy to them.

The following examples illustrate the various aspects of the invention, but are not intended to limit the invention. Unless specified otherwise, temperatures are given in degrees Centigrade and parts by weight.

Example 1

To a rapidly stirred solution of 36.1 parts by weight of 1,4,5,6,7,7 - hexachlorobicyclo - (2.2.1)-5-heptene-2,3-dimethanol in 444 parts by weight tetrahydrofuran were added 8 parts of powdered sodium hydroxide. The temperature of the reaction mixture was held at 20 to 25 degrees centigrade for 0.5 hour, and then one-half of the reaction mixture was removed from the reactor and was acidified with 5.5 parts of 5 normal hydrochloric acid. The salt that was precipitated from the acidified portion of the reaction mixture was filtered. The polymer was precipitated from the reaction mixture by slowly adding the filtrate to an agitated volume of ethanol. The polymer was redissolved in 44 parts by weight of tetrahydrofuran, and was then reprecipitated to provide 14.3 parts of polymer product, designated as fraction A. The reaction of the other portion of the reactor contents was continued until a total reaction time of 3 hours had elapsed. The resulting reaction product was recovered in the same manner as before to provide 10.6 parts of polymer designated fraction B.

The polymer fractions A and B had molecular weights of 6900 and 7000 respectively, and chlorine contents of 53.7 percent and 53.6 percent, respectively.

Example 2

A mixture of a solution of 7.5 parts by weight of sodium hydroxide and 15 parts of water, and a solution of 47 parts of 1,4,5,6,7,7-hexachlorobicyclo-(2.2.1)-5-heptene-2,3-dimethanol dissolved in 516 parts by weight of dioxane was agitated at a temperature of about 30 degrees centigrade for 19 hours. The resulting reaction product was treated with dilute hydrochloric acid, and was then filtered. The resulting reaction product was treated with dilute hydrochloric acid, and was then filtered. The polymer product was precipitated by pouring the filtrate into a large volume of methanol. The analysis of the polymer product indicated that it has a molecular weight of 4700.

Example 3

8 parts by weight of powdered sodium hydroxide were added to an agitated solution of 36.1 parts of 1,4,5,6,7,7-hexachlorobicyclo-(2.2.1)-5-heptene-2,3-dimethanol dissolved in 550 parts by weight of dimethylsulfoxide at a temperature of 20 degrees centigrade. The reaction mixture was maintained at 20 degrees centigrade for 10 minutes. Thereafter, the reaction product was filtered and then introduced to 392 parts by weight of ethanol. Then, 1000 parts of water containing one part of 5 normal hydrochloric acid were added to the alcoholic solution of polymer to precipitate the polymer. The resulting polymer was dissolved in tetrahydrofuran and reprecipitated by adding the solution to methanol. The resulting product had a molecular weight of 1850.

Example 4

A solution of 36.1 parts by weight of 1,4,5,6,7,7-hexachlorobicyclo-(2.2.1)-5-heptene - 2,3 - dimethanol in 944 parts by weight of dimethylformamide was prepared and cooled to 15 degrees centigrade. Then, 4.8 parts by weight of powdered sodium hydroxide were added to the solution and the resulting mixture was rapidly stirred for 20 minutes. At the conclusion of the reaction, the reaction mixture was treated with 2 parts by weight of 5 normal hydrochloric acid, and then filtered. 2000 parts by weight of water were slowly added to the filtrate to precipitate the polymer. The polymer product was dissolved in tetrahydrofuran, and reprecipitated by adding this solution to methanol. Analysis of the polymer showed that it had a molecular weight of 2400.

Example 5

An agitated mixture of 18 parts by weight of 1,4,5,6,7,7-hexachlorobicyclo-(2.2.1)-5-heptene-2,3-dimethanol, 4.91 parts by weight of lithium hydroxide monohydrate, and 222 parts by weight of tetrahydrofuran was heated at a temperature of about 65 degrees centigrade for 1.25 hours. Thereafter the reaction mixture was filtered and introduced to a large volume of aqueous methanol solution to precipitate the polymer product.

Example 6

16 parts by weight of sodium hydroxide in a 50 percent aqueous solution were added 148 parts of 1,4,5,6-tetrachloro-7,7-dimethoxy-bicyclo - (2.2.1) - 5-heptene-2,3-dimethanol in 444 parts by weight of tetrahydrofuran. The resulting solution was heated to about 65 degrees centigrade and maintained at that temperature for about 10 hours. The reaction mixture was acidified with dilute hydrochloric acid. The polymer product was precipitated by contacting the reaction solution with a water-methanol mixture. The polymer was dried and found to contain 33.9 weight percent chlorine and have a molecular weight as measured in tetrahydrofuran of about 4400.

The procedure of Example 1 is repeated to produce polymer compositions with the following bicyclo alcohols.

Example 7

1,4,5,6 - tetrachloro-7,7-dibromobicyclo-(2.2.1)-5-heptene-2,3-dimethanol.

Example 8

1,4,5,6 - tetrachloro-7,7-difluorobicyclo-(2.2.1)-5-heptene-2,3-dimethanol.

Example 9

A mixture of 56 parts of powdered potassium hydroxide and a solution of 180 parts of 1,4,5,6,7,7-hexachlorobicyclo-(2.2.1)-5-heptene-2,3-dimethanol in 2220 parts by weight of tetrahydrofuran was agitated at 20 to 25 degrees centigrade for one hour. Five parts of 5 normal hydrochloric acid were added to the reaction mixture, which was then filtered. To the resulting filtrate were added about 5900 parts by weight of methanol to precipitate the polymers. The polymer was washed with methanol and dried. 100 parts of polymers were recovered. The moleclular weight of the product as determined by the isothermal distillation technique in a Mechrolab vapor pressure osmometer was 8500, and as determined by membrane osmometry was 10,000.

Example 10

A polymer solution was prepared by dissolving 43 parts by weight of the polymer prepared in Example 1 in 2590 parts by weight of toluene. The resulting polymer solution was applied to a smooth hard surface, and the toluene was evaporated from the solution. The resulting polymer film was hard, transparent and colorless.

Example 11

55 parts of finely divided polypropylene was blended with 30 parts of finely divided polymer of the type prepared in Example 2, and 15 parts of finely divided antimony trichloride. The mixture was dry blended for 30 minutes, melt blended for 10 minutes at 200 degrees centigrade and molded into a 7 mm. diameter rod at 200 degrees centigrade. The test bar was subjected to ASTM D–635 fire retardance test. The sample was found to self-extinguish between 19 and 71 seconds, average self-extinguishing time of 33 seconds. The sample did not drip during the test. In the absence of the polymer of the invention, the polypropylene and antimony oxide are "burning" by the ASTM D–635 test.

In the foregoing specification, unless specified otherwise, the molecular weights were determined in tetrahydrofuran by the isothermal distillation technique in a Mechrolab vapor pressure osmometer.

While this invention has been described with reference to several specific embodiments, it will be recognized by those skilled in the art that many variations are possible without departing from the spirit and scope of the invention.

What is claimed is:

1. A polymeric composition of matter having repeating units of the formula:

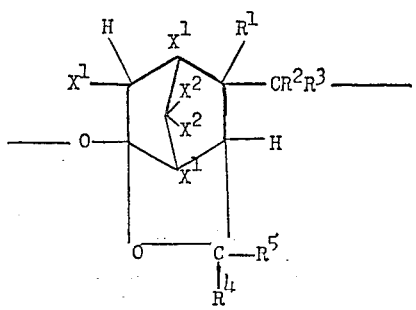

wherein $X^1$ is selected from the group consisting of fluorine, chlorine, bromine; and $X^2$ is selected from the group consisting of fluorine, chlorine, bromine and lower alkoxy; and $R^1$, $R^2$, $R^3$, $R^4$, $R^5$ are independently selected from the group consisting of hydrogen and alkyl.

2. A polymeric composition of matter having repeating units of the following formula:

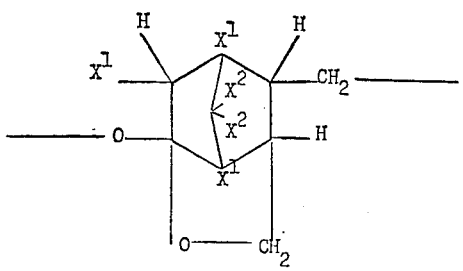

wherein $X^1$ is selected from the group consisting of fluorine, chlorine, bromine;

$X^2$ is selected from the group consisting of fluorine, chlorine, bromine and lower alkoxy.

3. A polymeric composition of matter having the formula:

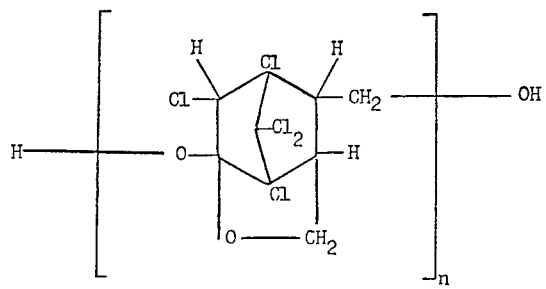

wherein $n$ has an average value of about 5 to about 70.

4. A process for producing a polymeric composition which comprises reacting a compound of the formula:

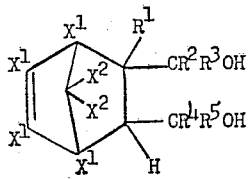

wherein $X^1$ is selected from the group consisting of fluorine, chlorine and bromine;
$X^2$ is selected from the group consisting of fluorine, chlorine, bromine and lower alkoxy; and
$R^1$, $R^2$, $R^3$, $R^4$, and $R^5$ are independently selected from the group consisting of hydrogen and alkyl;

with an alkali metal hydroxide in an inert diluent that is a solvent for the cyclic alcohol.

5. A process for producing a polymeric composition which comprises reacting a compound of the formula:

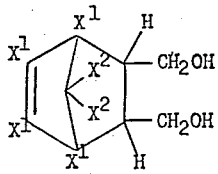

wherein $X^1$ is selected from the group consisting of fluorine, chlorine and bromine; and
$X^2$ is selected from the group consisting of fluorine, chlorine, bromine and lower alkoxy;

with an alkali metal hydroxide in an inert diluent that is a solvent for the cyclic alcohol, at a temperature in the range of 0 to 150 degrees centigrade; and thereafter recovering the polymeric composition from the reaction mixture.

6. A process for producing a polymeric composition which comprises reacting 1,4,5,6,7,7-hexachlorobicyclo-(2.2.1)-5-heptene-2,3-dimethanol with an alkali metal hydroxide in an inert diluent that is a solvent for the cyclic alcohol at a temperature in the range of 0 to 150 degrees centigrade and thereafter recovering the polymeric composition from the reaction mixture.

7. A process for producing a polymeric composition which comprises:

(1) reacting 1,4,5,6,7,7-hexachlorobicyclo-(2.2.1) - 5-heptene-2,3-dimethanol with sodium hydroxide in tetrahydrofuran at a temperature in the range of 15 ot 100 degrees centigrade;
(2) acidifying the resulting reaction product; and
(3) precipitating the polymeric composition from the reaction mixture.

No references cited.

SAMUEL H. BLECH, *Primary Examiner.*